United States Patent Office 3,619,860
Patented Nov. 16, 1971

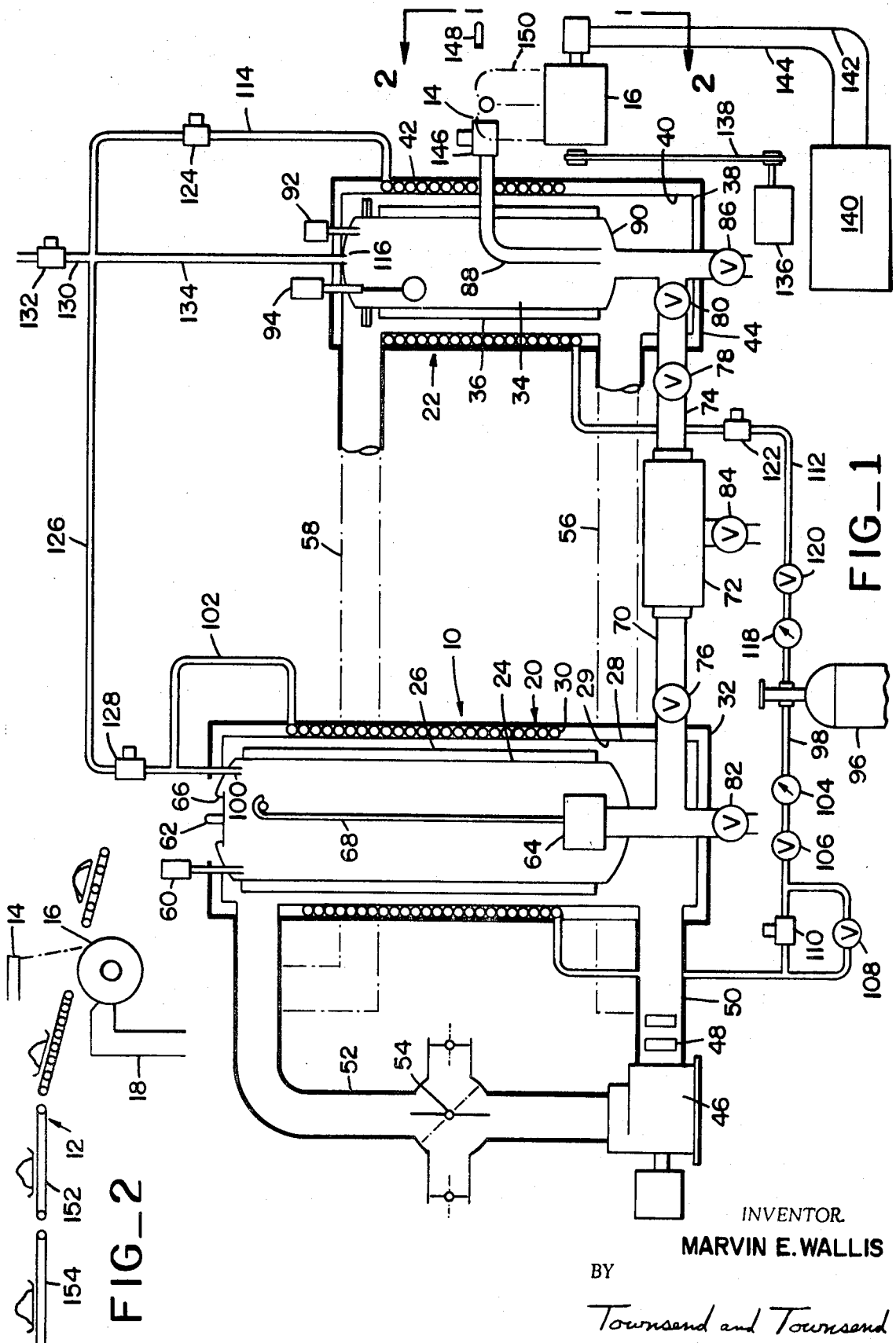

3,619,860
APPARATUS FOR PRODUCING PLASTIC FILM
Marvin E. Wallis, San Luis Obispo, Calif.
(873 S. Kellog Ave., Goleta, Calif. 93017)
Filed May 2, 1969, Ser. No. 821,203
Int. Cl. B29f 3/00
U.S. Cl. 18—12 SJ
10 Claims

ABSTRACT OF THE DISCLOSURE

In a method and apparatus for producing plastic film, the step of and means for forming viscous thermoplastic resin into a film, the step of and means for heating a thermoplastic resin to a viscous liquid state, and the step of and means for supplying the heated viscous thermoplastic resin to the film-forming means under substantially constant pressure.

SUMMARY OF THE INVENTION

This invention relates to a method and apparatus for producing plastic film and more particularly to an improved method and apparatus for producing a planar, continuous, steady, unbroken sheet of plastic film particularly adapted for use in packaging food products although it will be understood that the present invention may be utilized for other purposes such as for producing plastic film in sheets for end uses other than packaging.

Heretofore methods and apparatus have been provided for projecting film-like sheets of a thermoplastic coating material which is a viscous liquid at elevated temperatures and a solid at ordinary room temperatures into a coating zone and moving food products or other goods to be packaged through the flowing sheets. In such prior methods and apparatus the film-like sheets issue from a nozzle or nozzles which includes means to form the discharging liquid into sheets, and as the articles pass through the sheets each sheet lays itself onto the surfaces of the article which oppose the direction of the flow of the liquid comprising the sheet. By providing suitable nozzles disposed above and on various sides of the path of the articles to be packaged the articles become coated and covered by the viscous material. Prior methods and apparatus of the aforementioned types are disclosed, for example, in U.S. Pats. 3,008,834, 3,178,866 and 3,220,379 issued to the applicant of the present invention.

Prior known methods and apparatus of the indicated character utilize mechanical pumps to force the viscous liquid to the film-forming nozzles and were not entirely satisfactory particularly when using high viscosity materials such as chemical resins in the range of 3,000 to 100,000 centipoises or higher, which high viscosities are essential in producing commercially acceptable plastic film. The principal disadvantages encountered in prior known film-formng apparatus employing pumps to force the viscous liquid to the film-forming nozzles are that it is difficult to produce homogeneous, steady, unbroken sheets of plastic. Such difficulties may be attributed to the fact that the pump must be isolated from close proximity to the film-forming head or nozzle to prevent vibration forces from acting thereon with the result that high hydraulic resistance is encountered thereby requiring excessively high operating pressures. In addition it is difficult to produce continuously a sheet that is clear since a mechanical pump tends to agitate the hot plastic fluid thereby making it milky and translucent. Moreover pumps designed to produce continuous non-pulsating flow are very expensive and even the most perfect of such pumps will not produce the steady, even projection of liquid plastic sheets necessary for commercial applications. It is also difficult and time consuming to maintain the pumps in the satisfactory, sanitary condition essential for the packaging of food products, and mechanical problems are increased at the necessarily high operating pressures and high operating temperatures of 300° F. to 500° F. Furthermore relatively large motor drives and speed reducing apparatus are required for use with pumps and such drives and apparatus are expensive to purchase and maintain.

Heretofore clear plastic sheets have also been produced with equipment commonly known as extruders. Such equipment is not practical for use in producing the moving liquid sheets of plastic required under the objectives of the present invention since complete liquification and substantial velocity of film extrusion or projection is essential for commercial packaging applications of liquid plastic sheets. A further disadvantage of the use of an extruder to produce the necessary clear, homogeneous liquid moving sheets of plastic is the extruder's inability to melt perfectly the resin to a condition essential for liquid film packaging or other end uses.

An object of the present invention is to overcome the above as well as other disadvantages of the prior art methods and apparatus and to provide an improved method and apparatus which enables the production of homogeneous sheets of plastic film without the customary pinholes and slits found in plastic film produced by conventional extruders.

Another object of the present invention is to provide improved apparatus for producing plastic film which is relatively simple in construction, economical to manufacture, durable, efficient and reliable in operation.

Another object of the present invention is to provide improved film-forming apparatus incorporating improved pressure applying means enabling the production and projection of a viscous liquid into a planar, continuous, steady, unbroken sheet for use in packaging various items as well as the production of plastic film for other uses.

Another object of the present invention is to provide an improved method and apparatus for projecting economically and with simplicity clear liquid sheets of plastic that are vibration free and homogeneous.

Still another object of the present invention is to provide an improved method and apparatus for forming clear plastic film that protects the plastic from chemical and mechanical breakdown and that enables the use of plastic resins having viscosities ranging from 3,000 to 100,000 centipoises or higher.

The above as well as other objects and advantages of the present invention will become apparent from the following detailed description, the appended claims and the accompanying drawings.

BRIEF DESCRIPTION OF THE DRAWINGS

FIG. 1 is a partially schematic, elevational view, with portions in cross section, of apparatus embodying the present invention; and FIG. 2 is a schematic end view of a portion of the structure illustrated in FIG. 1.

DETAILED DESCRIPTION OF THE PREFERRED EMBODIMENT

Referring to the drawings the present invention is illustrated as embodied in apparatus generally designated 10 which is particularly adapted for use in packaging food products although it will be understood that the present invention is applicable to other purposes such as for the production of plastic film and sheets for a wide variety of end uses. In the embodiment of the invention illustrated the apparatus 10 includes a conveyor generally designated 12, a film-forming head or nozzle 14, a tensioning roller 16 and scrap recovery means 18 each of which may be of the type disclosed in U.S. Pat. 3,178,-866, it being understood that the particular conveying means and film-forming head or nozzle means may be of any desired type and that the tensioning roller and scrap recovery means may or may not be necessary for a particular application. In accordance with the present invention a melting component, generally designated 20, and a pressure component, generally designated 22, are provided which serve to supply hot viscous liquid plastic to the film-forming nozzle 14 under continuous as distinguished from pulsating pressure. The melting component 20 is comprised of a pressure vessel 24 which may be made of steel or other suitable heat conducting material having sufficient strength to withstand relatively low pressures in the order of 15 to 40 pounds per square inch. The size of the pressure vessel 24 may be varied to suit the particular volume of the desired plant operation and the amount of scrap resin to be recovered. A plurality of circumferentially spaced, longitudinally extending heat exchange fins 26 are provided on the periphery of the pressure vessel 24 to facilitate the transfer of heat to plastic resin which is charged into the pressure vessel 24. The pressure vessel 24 is enveloped by a jacket 28 spaced from the fins 26 to define a chamber 29 between the pressure vessel and the inner wall of the jacket 28 and the exterior of the jacket is wrapped with metal tubing 30, the jacket 28 and tubing 30 being made of aluminum or other suitable material having high heat transfer characteristics. The jacket 28 and tubing 30 are insulated by a suitable casing 32 formed of heat insulating material. The tubing 30 serves to preheat an inert gas such as carbon dioxide or nitrogen which is adapted to be applied under pressure to the interior of the pressure vessel 24 as will be described hereinafter in greater detail, the inert gas being heated so that it will not cool the plastic when the gas is introduced into the interior of the pressure vessel 24.

The pressure component 22 is constructed in a manner generally similar to the melting component 20 and is comprised of a pressure vessel 34 which may be formed of steel or other suitable material having sufficient strength to withstand pressures in the range of 200 to 2000 pounds per square inch. A plurality of heat transfer fins 36 are provided on the exterior of the pressure vessel 34, the fins being disposed in circumferentially spaced relationship around the periphery of the pressure vessel 34 and extending generally longitudinally thereof. A jacket 38 envelops the pressure vessel 34 in spaced relationship with respect to the fins 36 so as to define a chamber 40 around the periphery of the pressure vessel 34 to facilitate the flow of hot gases therearound. The jacket 38 is wrapped on the exterior with metal tubing 42 which serves to preheat an inert gas such as carbon dioxide or nitrogen so that such gas will not cool the plastic when the gas is introduced into the interior of pressure vessel 34 as will be described hereinafter in greater detail. An insulation casing 44 is provided which is formed of suitable heat insulating material and which serves to insulate the jacket 38 and the tubing 42.

Although it is not essential it is preferred to coat the entire interior of the pressure vessels 24 and 34 with a protective film such as polytetrafluoroethylene. Such a coating assists in combating oxidation of the vessel and the products contained therein at high temperatures and also helps prevent buildup of the viscous material on the interior surfaces of the vessels. It is also preferred to coat with polytetrafluoroethylene all other interior parts or accessories such as the liquid level controls and flow assemblies which will be described hereinafter.

In order that heat may be supplied to the chambers 29 and 40 defined between the pressure vessels 24 and 34 and the jackets 28 and 38, respectively, a blower 46 is provided which is equipped with conventional fin-type calrod heaters 48 which are disposed in the stream of the air emanating from the blower 46. The bower 46 is adapted to force hot air into the chambers 29 and 40 surrounding the pressure vessels so that the hot air heats the contents of the pressure vessels 24 and 34 and also heats the inert gas within the tubing 30 and 42. The hot air emanating from the blower 46 and heaters 48 is conducted to the chamber 29 surrounding the pressure vessel 24 through a conduit 50 and the air is returned to the blower from the chamber 29 through a conduit 52, a suitable damper 54 being interposed in the conduit 52 to facilitate the control of the flow of air therethrough and the introduction of fresh air into the system. Hot air emanating from the blower 46 and the heaters 48 is also conducted to the chamber 40 surrounding the pressure vessel 34 through a conduit 56 and the air returns to the blower from the chamber 40 through a conduit 58 connected to the conduit 52.

The melting component also includes a safety relief valve 60 which communicates with the interior of the pressure vessel 24. In order to facilitate charging of the pressure vessel 24 a quick-opening cover 62 is provided. A drop-in filter 64 is also provided which may be inserted in and removed from the pressure vessel through the opening 66 which is closed by the cover 62, a suitable retrieving handle 68 being utilized to insert and remove the filter 64. The filter 64 is intended to keep relatively large pieces of foreign material such as string or paper from entering the high pressure vessel 34 and may be easily removed for cleaning when necessary.

The interior of the pressure vessel 24 communicates with the interior of the pressure vessel 34 through the filter 64, a conduit 70, a filter 72 and a conduit 74, suitable solenoid valves 76 and 78 and a check valve 80 being provided to facilitate the control of flow of hot plastic from the pressure vessel 24 to the pressure vessel 34. Drain valves such as 82, 84 and 86 may also be provided to facilitate cleaning of the pressure vessels and the filter 72. The interior of the pressure vessel 34 is connected to the film-forming head or nozzle 14 through a generally L-shaped conduit 88 the lower end of which is disposed near but spaced from the lower end 90 of the pressure vessel 34. A relief valve 92 is provided to insure safe operation of the pressure vessel 34 and a liquid level control 94 is also provided which serves to maintain the level of the hot plastic in the pressure vessel 34 at the desired level.

A source 96 of inert gas such as carbon dioxide or nitrogen is provided which is maintained under pressure in excess of the maximum desired operating pressure in the pressure vessel 34. The pressure source 96 of inert gas communicates with the interior of the pressure vessel 24 through a conduit 98 which is connected to the tubing 30, the tubing 30 in turn being connected to an inlet conduit 100 by a conduit 102. In order to control the flow to the inlet 100, a low pressure regulator valve 104 is provided which may be set at the desired operating pressure for the low pressure vessel 24, as for example in the range of 15 to 40 pounds per square inch. Suitable hand operated valves 106 and 108 are provided as well as a solenoid valve 110 for controlling the flow of inert gas through the conduit 98, the tubing 30 and the conduit 102 to the inlet 100. The source 96 of inert gas also communicates with the interior of the pressure vessel 34 through a conduit 112 connected to the tubing 42, a conduit 114 connecting the tubing 42 to an inlet conduit 116. A high pressure regulator valve 118 is provided which is adapted to be set at the desired operating pressure of the pressure vessel 34, as for example in the range from 200 to 2000 pounds per square inch, depending upon the particular plastic being utilized, and the flow through the conduit 112, the tubing 42 and the conduit 114 to the inlet 116 is also controlled by a hand operated valve 120 and solenoid actuated valves 122 and 124. The inlet conduit 100 communicates with the atmosphere through a conduit 126 the flow through which is controlled by a solenoid valve 128, the conduit 126 being connected to a conduit 130 which is open to atmosphere through a solenoid valve 132. The inlet conduit 116 also communicates with the atmosphere through a conduit 134 connected to the conduit 130.

As shown in FIG. 1, the roller 16 is adapted to be driven by a motor 136 through the agency of a belt 138. The roller 16 may be heated or cooled as desired by supplying fluid at the desired temperature from a suitable source 140 through an inlet conduit 142 which communicates with the interior of the roller 16, the fluid being returned to the source 140 by a return line 144.

In the operation of this embodiment of the invention and prior to charging the pressure vessel 24 with plastic resin or scrap accumulated from prior operation of the system, the hand operated valve 108 is partially opened so as to allow inert gas to leak from the source 96 into the interior of the pressure vessel 24 so as to purge the pressure vessel 24 of oxygen, such flow of inert gas being allowed to continue during the charging process. The pressure vessel 24 is then filled with plastic resin to the desired height by introducing the plastic into the pressure vessel 24 through the opening 66 after which the cover 62 is closed to render the vessel 24 pressure tight. After the cover 62 is closed the blower 46 and heaters 48 are energized so as to heat the plastic resin to the desired temperature. The solenoid valves 128 and 132 are then opened so as to purge any oxygen which may have been introduced into the system during the filling operation. In this connection it should be noted that after the system is operative, purging of the pressure vessel 24 is accomplished by utilizing the hot high pressure gas from the pressure vessel 34 which must be exhausted to enable recharging of the high pressure vessel 34 at 25 to 30 pounds per square inch. This is done by opening solenoid valves 128 and 124. The purging serves another important function in the production of plastic film by removing any small quantities of moisture that may be on or occluded in the plastic resin.

After the plastic in the pressure vessel 24 has been brought to the desired operating temperature (300° F. to 500° F.) the solenoid valves 78 and 132 are opened and inert gas from the source 96 is applied to the interior of the pressure vessel 24 through the pressure regulator 104, the conduit 98, the tubing 30, the conduit 102 and the inlet 100, the valves 106 and 110 being open and the valves 108 and 128 being closed at this point. The inert gas forces the melted plastic through the filter 64, the conduit 70, the filter 72, the conduit 74 and the valves 78 and 80 into the pressure vessel 34. After the pressure vessel 34 has been filled to the desired level as controlled by the liquid level control 94, the valve 132 is closed since the pressure vessel 34 will then have been purged of all oxygen. The blower 46 and heaters 48 serve to maintain the plastic in the pressure vessel 34 at the desired temperature by circulating hot air through the chamber 40, the air being supplied through the conduit 56 and returning from the chamber 40 through the conduit 58.

After the pressure vessel 34 has been charged as above described, the solenoid valve 122 is opened so as to raise the pressure in the pressure vessel 34 to the desired operating pressure as controlled by the regulator 118. As previously mentioned the operating pressure in the pressure vessel 34 may be from 200 to 2000 pounds per square inch depending on the particular plastic being utilized. If desired the entire purging, melting and charging operations may be controlled by a conventional programming timer which is actuated after the cover 62 is closed on the pressure vessel 24. Moreover the pressure vessel 24 may be charged by means of conventional extruder or other type pre-melters.

The roller 16 is then actuated and a valve 146 controlling the flow from the conduit 88 to the film-forming nozzle 14 is opened allowing controlled flow of the hot plastic through the film-forming head or nozzle 14. If desired a photo-electric cell 148 may be employed to automatically energize the conveyor 12 the instant the plastic sheet 150 is at operating width. The products to be packaged are then automatically spaced by a short section 152 of the infeed conveyor that operates at considerably higher speed than the loading section 154 as the articles are fed through the plastic sheet 150. Any film that is not applied to the articles is picked up by the roller 16 and delivered to a suitable scrap storage container by the scrap recovery means 18.

As pointed out in Patent 3,178,866, the roller 16 preferably travels at a slightly higher rate of speed than the plastic sheet 150 and the roller 16 applies tension to the film. Thus any plastic not applied to the product is instantly pulled and/or trimmed off the edges of the product, tray or other supporting means thus leaving no tails.

In some applications the cooled or heated tensioning roller 16 need not be utilized in which event scrap or resin that is not applied to the product can be picked up in a Teflon coated container, the Teflon providing for easy removal once the resin cools. Such scrap can then be re-melted in the melting vessel along with virgin resin. It is preferred that the recovery container be so designed that the configuration of the recovery container is such as to produce cooled plastic in a shape that fits the opening in the melter.

In commercial operations the entire operation may be controlled by a programmed timer, tape, or computer if desired.

While a preferred embodiment of the invention has been illustrated and described it will be understood that various changes and modifications may be made without departing from the spirit of the invention.

What is claimed is:

1. An apparatus for producing plastic film, including a film-forming head capable of converting viscous thermoplastic resin into a film, the improvement comprising means for continuously supplying viscous thermoplastic resin to said head under substantially constant pressure, said means including a pressure vessel adapted to hold a viscous thermoplastic resin in the interior thereof, means connecting the interior of said vessel to said head, and means for supplying a gas under pressure to the interior of said vessel whereby said gas directly forces said resin to said head.

2. The apparatus as set forth in claim 1 including means for heating said vessel.

3. The apparatus as set forth in claim 1 including means for heating said gas prior to the entrance thereof into said vessel.

4. The apparatus as set forth in claim 1 including a source of gas under pressure, means connecting said source to the interior of said vessel, means for heating said vessel, and means for heating the gas prior to the entrance thereof into said vessel.

5. The apparatus as set forth in claim 1, said means including a first pressure vessel and a second pressure vessel, means connecting the interior of said first pressure vessel to said head, means connecting the interior of said second pressure vessel to the interior of said first pressure vessel, and means for supplying gas under pressure to the interior of each of said vessels.

6. The apparatus as set forth in claim 5 including means for heating each of said vessels.

7. The apparatus as set forth in claim 5 including means for heating the gas prior to the entrance thereof into said vessels.

8. The apparatus as set forth in claim 5 including a source of gas under pressure, means connecting said source to the interior of each of said vessels, means for heating each of said vessels, and means for heating the gas prior to the entrance thereof into said vessels.

9. Apparatus for producing plastic film comprising, in combination, a melting component and a pressure component each adapted to hold plastic resin under pressure, each of said components including a pressure vessel having heat exchange means on the exterior thereof, a jacket enveloping said pressure vessels to define a chamber therebetween, conduit means connecting said pressure vessels, heating means communicating with said chambers, means for continuously supplying an inert gas under pressure directly to said resin in each of said pressure vessels, means in each of said chambers for heating said gas prior to the entry thereof into said vessels, valve means controlling the flow of said inert gas to each of said pressure vessels, and film-forming nozzle means communicating with one of said pressure vessels.

10. Apparatus for producing a plastic film from a thermoplastic material which is a solid below a predetermined temperature and a viscous liquid above said predetermined temperature, said apparatus comprising, in combination, means for initially heating thermoplastic material to a viscous liquid state, means for applying continuously substantially constant fluid pressure directly to said thermoplastic material while maintaining said material in a viscous liquid state, and means for discharging the pressurized viscous liquid material in the form of a planar, continuous, steady, unbroken sheet.

References Cited
UNITED STATES PATENTS 2,478,013    8/1949    Roddy.
3,119,150    1/1964    Hungerford _____ 18—12 DS H. A. KILBY, Jr., Primary Examiner U.S. Cl. X.R.

18—12 DS